United States Patent [19]
Schwartz

[11] 4,121,564
[45] Oct. 24, 1978

[54] SOLAR ENERGY RECEIVER

[75] Inventor: Jacob Schwartz, Arlington, Mass.

[73] Assignee: Sanders Associates, Inc., Nashua, N.H.

[21] Appl. No.: 765,461

[22] Filed: Feb. 4, 1977

[51] Int. Cl.² .............................................. F24J 3/02
[52] U.S. Cl. .................................... 126/270; 126/271; 60/641
[58] Field of Search ................... 126/270, 271; 60/641, 60/650, 682

[56] References Cited

U.S. PATENT DOCUMENTS

| | | | |
|---|---|---|---|
| 1,700,675 | 1/1929 | Goddard | 126/271 |
| 3,203,167 | 8/1965 | Green, Jr. | 60/641 |
| 3,220,191 | 11/1965 | Berchtold | 60/682 |
| 3,234,931 | 2/1966 | Whitaker | 126/270 |
| 3,293,850 | 12/1966 | Morrison | 60/650 |
| 3,654,759 | 4/1972 | Abbot | 60/641 |
| 3,924,604 | 12/1975 | Anderson | 126/270 |
| 4,033,118 | 7/1977 | Powell | 126/270 |
| 4,038,969 | 8/1977 | Smith | 126/270 |

FOREIGN PATENT DOCUMENTS 1,122,344   5/1956   France ........................................ 60/641

OTHER PUBLICATIONS

Kreith, Frank, Principles of Heat Transfer, Scranton, International Textbook Company, 1961, pp. 354–361.

*Primary Examiner*—Kenneth W. Sprague
*Attorney, Agent, or Firm*—Louis Etlinger; Robert K. Tendler

[57] ABSTRACT

An improved long-life design for solar energy receivers provides for greatly reduced thermally induced stress and permits the utilization of less expensive heat exchanger materials while maintaining receiver efficiencies in excess of 85% without undue expenditure of energy to circulate the working fluid. In one embodiment, the flow index for the receiver is first set as close as practical to a value such that the Graetz number yields the optimal heat transfer coefficient per unit of pumping energy, in this case, 6. The convective index for the receiver is then set as closely as practical to two times the flow index so as to obtain optimal efficiency per unit mass of material.

21 Claims, 4 Drawing Figures

SOLAR ENERGY RECEIVER

BACKGROUND OF THE INVENTION

This invention relates to solar energy receivers utilized with focused solar energy and, more particularly, to a method and apparatus for optimizing the performance of the receiver and extending its useful life.

Solar energy receivers which utilize focused solar radiation transfer the energy in the focused solar radiation to a working fluid, normally air, through the use of a heat exchanger located in the receiver cavity. Normally, solar radiation is focused through an aperture or apertures in the cavity onto the heat exchanger. The heat exchanger, in general, channels the working fluid, and in one embodiment may consist of a honeycomb of tubes. These tubes are oriented so that focused solar energy impinging on the honeycomb travels down the tubes where it is absorbed. For convenience, the illuminated end of the heat exchanger is called its "face". While the subject invention applies to a number of different solar energy receivers, it will be described in connection with this type solar energy receiver for convenience.

Solar energy receivers have been mounted on masts or in so-called "power towers" above a mirror field which redirects solar energy and focuses it onto the receiver. As a result of the use of as many as 1,000 mirrors, concentrated solar energy may cause the solar receiver to exceed temperatures of 3,000° F. In order to withstand the intense solar radiation, heat exchangers of exotic materials such as silicon carbide or ceramicmetal composites have been used, with the heat exchanger materials being chosen to withstand the high input temperatures. The high input temperatures were thought necessary to insure that high exit gas temperatures could be efficiently achieved. However, at these high temperatures, and more particularly, for sharp, non-linear temperature profiles aklong the heat exchanger, tremendous thermal stress is introduced which causes distortion of the heat exchanger. While solar energy receivers of the type described work reasonable satisfactorily, unless heat exchanger tubes are made from exotic costly materials, the tubes may buckle, and tend to turn inside out under this type stress. This limits the useful life of the heat exchanger for some commercial applications. For commercially acceptable power production applications, major equipment lifetimes in excess of 30 years are required. Thus, for high temperature solar receivers to be commercially acceptable, either very costly heat exchanger materials must be used or some method must be provided to insure long life with more conventional materials.

More particularly, most common materials degrade significantly at temperatures above 3,000° F. and their use in "power tower" applications presents serious problems. The degradation of materials which occurs at high temperatures refers to mechanical failures in which the heat exchangers crack or melt, and to factors which reduce heat transfer from the walls of the heat exchanger to the working gas, such as corrosion, errosion, or chemical change.

With oxidation at high temperatures, heat exchanger materials become weakened and crack. Moreover, at high temperatures, the phenomenon of "creep" exists, in which upon heating the thermal expansion is so great that the heat exchanger materials distort and become weakened. "Creep" implies non-elastic deflections so that a relatively small, but steady force produces a growing deflection. Of course, at temperatures above 3,000° F., there is a possibility of the melting of the heat exchanger material or bringing the material close to the melting point, which also results in a weakening of the structure and potential physical failure.

In addition to the effect of thermal shock on the materials in terms of physical failure, there may be a change in the emissivity of the walls of the heat exchanger due to chemical degradation or errosion which lowers receiver efficiency. In addition, the efficiency of the receiver can be further affected through surface degradation by reductions in the "$h$" or "$U_{eff}$" value, where "$h$" is the "film coefficient of heat transfer" at a point and "$U_{eff}$" is an averaged value over the internal heat exchanger area. "$h$" is generally a local microscopic coefficient which may vary from place to place, while "$U_{eff}$" is generally an overall averaged value of heat transfer coefficient.

It is a finding of the subject invention that with a unique selection of the solar receiver convective index and flow index, efficiencies exceeding 85% may be obtained with output temperatures of 1800° – 2000° F., in which the working temperature of the heat exchanger is substantially uniform throughout its length and need never exceed the 2000° F. outlet air temperature by more than 100° F. That is to say, it is now possible to efficiently obtain sufficiently high exit gas temperatures without the necessity of heating any part of the heat exchanger substantially above the outlet air-temperature. Moreover, with a uniform heat distribution, thermally induced stress on the heat exchanger is significantly reduced which results in prolonged life for the heat exchanger. Additionally, because of the lowered operating temperature the corrosion and oxidation aspect associated with solar energy receivers is greatly reduced. Also, with reduced input temperatures thermal reradiation is reduced ($T^4$ law) which materially aids conversion efficiency. It should be noted that exit gas temperatures of 1800° F. or greater are clearly sufficient for the utilization of the subject solar energy receiver in a so-called Brayton cycle engine type power plant. Moreover, lower exit gas temperatures are useful when the gas is utilized to form steam in a conventional boiler type application.

In order to obtain the above noted efficiencies while running the receiver at no greater than 2000° F., perhaps the most important set of parameters are the Graetz number, $N_{Gr}$, the flow index, $I_{FLOW}$, and the convective index, $I_c$, of the receiver, all defined hereinafter. It is a finding of the subject invention that the flow index, when set such that the Graetz number is approximately equal to 6, provides optimal heat transfer without excessive pumping energy. Once the flow index has been set, it is then desireable to set the convective index of the solar receiver to be two times the flow index. This provides the optimal balance between heat transfer efficiency and receiver size, such that if the convective index is less than two times the flow index, efficiency is lost; whereas building a receiver where the convective index is much greater than two times the flow index, merely results in greater receiver size without any corresponding advantage. What is achieved is a receiver size which is set exactly at the point of optimal performance and useful life expectancy, thereby to eliminate excess size and cost.

As a matter of practically achievable tolerances, as well as impact on the efficiency, both the Graetz number and the flow index should not exceed the nominal values stated here, but may be as far as a factor of 2 below these levels before the impact on efficiency exceeds 10–20% of the optimal efficiency. For the convective index, the tolerances are stated differently. The nominal value may be exceeded by any amount desired, but any excess represents higher cost for negligible returns (gain in performance). On the downside $I_c$ may go as far as half the nominal value to degrade the projected efficiency from 88% to 82%. It should be emphasized that a solar receiver will "work" over a broad range about the nominal values, but will work best when "tuned" to the recommended levels. In practice, one might modify the receiver aperture and/or the flow rate in the field, as allowed by turbine considerations or by the solar flux pattern to optimize overall efficiency.

In order to set the flow index such that the Graetz number is equal to 6 various other parameters become important. First, the flow index must be set less than, but as close as practical to $6kL/D^2r_c$ such that the aforementioned Graetz number will not exceed, but will approximately equal 6, within reasonable design tolerance. Here k is the thermal conductivity of the gas, L is the length of the heat exchanger tube, D is its diameter, and $r_c$ is the cavity ratio of the receiver, e.g. $r_c$ = area of the illuminated face of the heat exchanger, $A_h$, divided by the area of the receiver aperture, $A_{Ap}$. This also takes into account the sublaminar flow conditions that exist in any efficient solar receiver. Obviously, there is a balance between turbulent flow which is more effective for heat transfer than laminar flow, and laminar flow which utilizes less pumping energy. Note, the object is to avoid turbulence because turbulence always causes heavy increases in energy required to maintain fluid flow. $N_G$, as large as possible short of 6 leads to maximum possible heat transfer short of requiring heavy expenditure of mechanical energy to maintain circulation.

For the convective index to be two times the flow index, $I_c$ is defined as $hA_s/A_{Ap}$, or more generally $U_{eff}A_s/A_{Ap}$, which the designer sets as closely as practical to the target value of twice the flow index. Here $A_s$ is the internal heat exchanger area exposed to solar radiation.

In order to achieve the Graetz number approximately equal to 6 along with the corresponding condition for flow index, it is practical to have the cavity ratio, $r_c$, greater than one. Moreover, the optical index in one operative embodiment is set greater than 6 in order to achieve maximum efficiency.

When all of the parameters just described are appropriately set, it is a unique finding of this invention that as solar energy is transferred to the heat exchanger the heat exchanger quickly achieves a relatively uniform temperature not exceeding 2000° F. throughout its length, thereby permitting the utilization of less expensive, less exotic heat exchanger materials and construction methods. Moreover, the heat exchanger is designed to a length which insures that the gas through the receiver attains the desired exit temperature at exactly the exit end of the heat exchanger, so that no excess heat exchanger material is used.

What has been found, is that it is not necessary to excessively heat up the face of the heat exchanger exposed to the focused radiation in order to obtain desired output temperatures. More generally, it has been found that it is possible with proper design to keep the temperature profile of the heat exchanger relatively flat, thereby to be able to lower the input temperature close to the chosen output temperature without losing efficiency. This means that fewer mirrors need be used which results in substantial cost savings. In addition to significantly reducing thermal shock, the lower input temperature permits running of the receiver at a minimum input temperature for a given or desired output temperature. As a result the requirements for the heat exchanger material are minimized. Most importantly, there is a striking gain in efficiency by reducing the $T^4$ reradiation with lower working temperatures.

This finding, predicated upon the above mentioned parameters, determines the appropriate size of the face of the heat exchanger, its spacing from the aperture of the solar energy receiver, the mass flow rate through the receiver and other critical parameters which insure an extremely high efficiency, low cost, long life solar energy receiver. If the suggested parameters are exceeded in any one direction, either efficiency will be lost or the amount of material for making the solar energy receiver increases substantially thereby increasing the cost of the solar energy receiver without increased efficiency.

It is therefore an object of this invention to provide a solar energy receiver with an improved useful life.

It is another object of this invention to provide a method of setting the parameters of a solar energy receiver which utilizes fluid heated by focused solar radiation.

It is a still further object of this invention to provide a solar energy receiver in which the efficiency is maximized while at the same time running the solar receiver at minimum input temperatures.

It is a still further object of this invention to provide solar energy receivers in which the danger of thermal/mechanical failure is minimized, and in which the mean time to failure is lengthened. These and other objects of the invention will be better understood in connection with the following description in view of the appended drawings in which:

DETAILED DESCRIPTION

Figure 1:
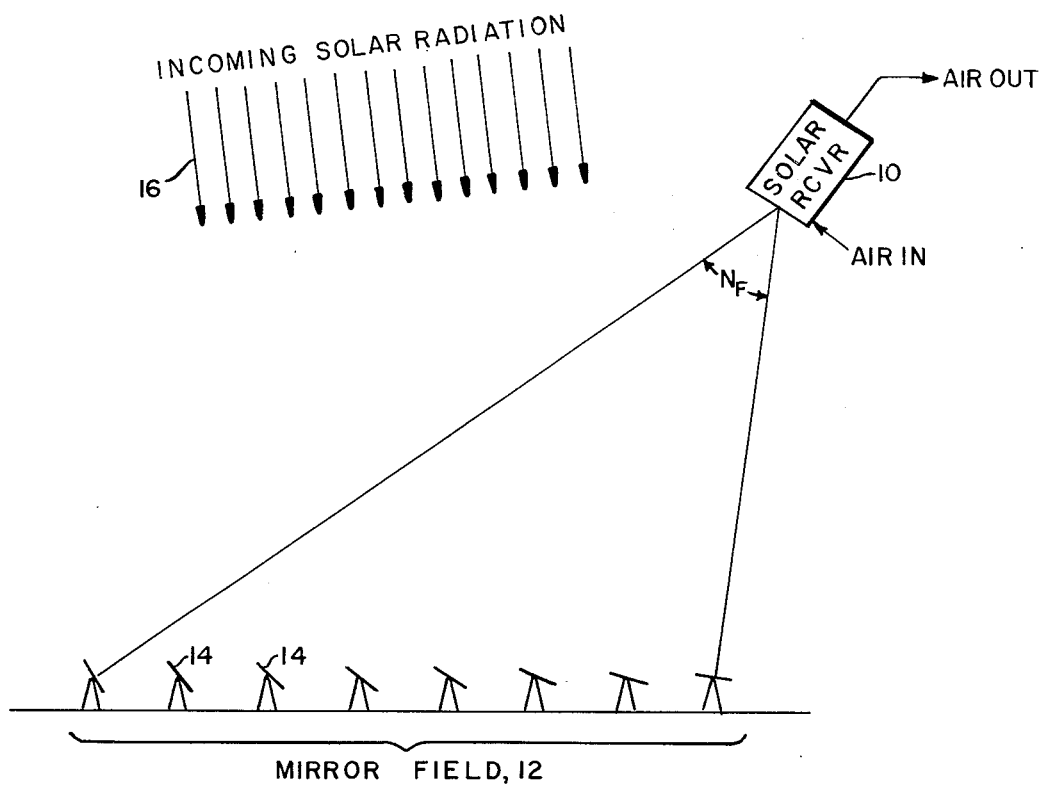
FIG. 1 is a diagramatic representation of a solar receiver located above a mirror field which focuses incoming solar radiation onto the receiver.

Referring now to FIG. 1, a solar energy receiver 10 is located above a mirror field 12 which, as is common, utilizes individually steerable mirrors 14 to focus incoming solar radiation diagramatically illustrated at 16 onto the solar receiver. As such, the mirrors define a focusing system having a f/number $N_F$. It will, of course, be appreciated that the subject receiver may be utilized with any type solar focusing apparatus. Receiver 10 is normally located in a power tower (not shown) which, in general, is a structure which houses the receiver and which may include power generating apparatus. Alternatively, fluid carrying lines may be provided from the solar receiver to power generating apparatus located on the ground. In general, the working fluid is introduced into the solar receiver where it is heated by the incident solar radiation. Thereafter, the exiting fluid is utilized to drive the power generating equipment. While the subject solar receiver may be utilized in a steam turbine system, its major utility, at least for Brayton cycle applications, resides in the utilization of air as the working fluid. As illustrated, air is introduced into the front end of the solar receiver, is heated by the incident solar radiation, and thereafter exits the solar receiver from which point it is coupled to the power generating apparatus or heat exchanger, in the steam boiler case.

Figure 2:
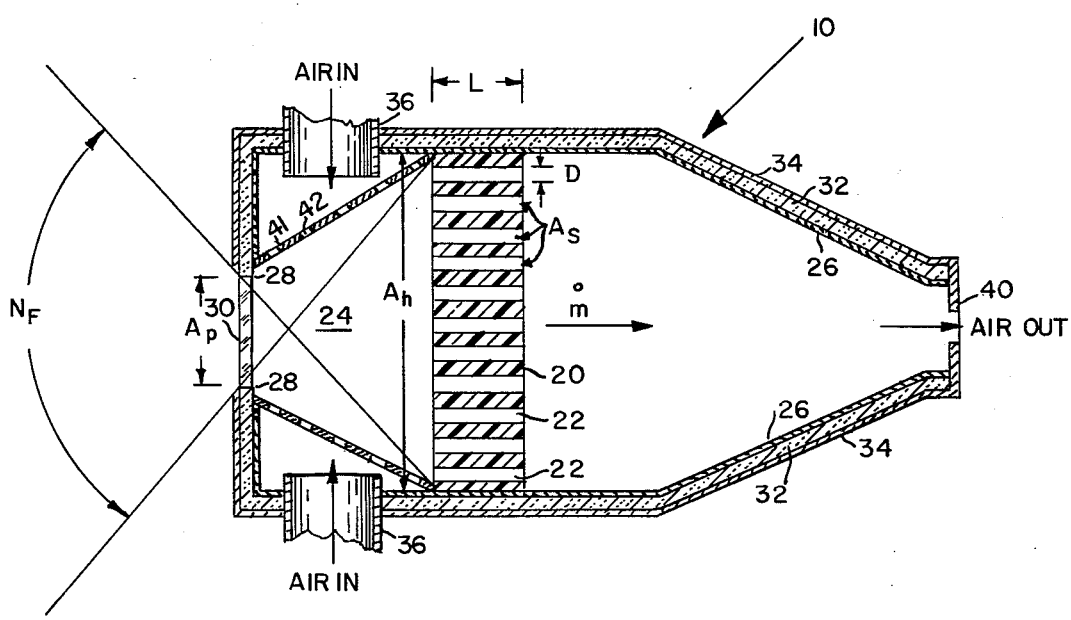
FIG. 2 is a cross sectional diagram of one embodiment of a solar receiver illustrating various parameters which are utilized in the calculations for obtaining an optimal receiver.

As illustrated in FIG. 2, one type solar receiver which may be utilized as receiver 10 includes a heat exchanger 20 which may be in the form of a honeycomb arrangement. The honeycomb body is provided with tubular channels 22 parallel to the longitudinal axis of the receiver. The length of these channels is designated L, while the diameter of the channels is designated D. The face area of the receiver, $A_h$, is calculated in accordance with the diameter of the honeycomb as illustrated in this figure. The honeycomb heat exchanger is located in a cavity generally indicated by reference character 24 which has diffusely reflective side walls 26 and an aperture 28. The area of the aperture, $A_{Ap}$, is calculated in accordance with the diameter illustrated. In one embodiment, the aperture carries a quartz window 30, the purpose of which is to seal the receiver for permitting pressurization. Insulation 32 is provided between inner wall 26 and outer walls 34, and input conduits 36 are provided ahead of the honeycomb heat exchanger for the introduction of air into the cavity. Air jet directing and forming means 40 are provided in the form of a truncated cone having apertures 42 which direct the incoming air towards the honeycomb heat exchanger. The total area of the honeycomb channels is designated $A_s$ and the mass flow rate through the honeycomb type structure is designated by m. Pressurization of the receiver is controlled by orifice 40 at the exit end of the receiver.

This type of receiver is described for illustration purposes only, it being understood that a large variety of solar receivers are characterized as having a heat exchanger with a face area as well as an aperture of a predetermined size.

As mentioned hereinbefore, there are several relationships of the various parameters of the heat, the solar energy receiver which contribute significantly to the optimal operation of the receiver. These parameters or indices are now listed for convenience.

INDICES $$I_c = \text{Convective Index} = \frac{U_{eff}A_s}{A_{Ap}} = U_{eff}r_c r_h = \frac{\zeta \, h_{NOMINAL} A}{A_{Ap}}$$

$$\frac{U_{eff}A_s}{A_{Ap}} = U_{eff}r_c r_h \cong 2 \, I_{FLOW}$$

$$r_c = \text{Cavity ratio} = \frac{A_h}{A_{Ap}} > 1$$

$$I_o = \text{Optical Index} = \frac{L}{DN_F} > 6$$

$$= \text{Graetz No.} = N_{Re} N_{Pr} \frac{D}{L} \leq 6 \text{(with equality preferred)}$$

$$I_{FLOW} = \text{Flow Index} = \frac{mC_p}{A_{Ap}} \leq \frac{6kL}{D^2} r_c \text{(with equality preferred)}$$

DEFINITIONS $h$ = film coefficient of heat transfer (local value)

$U_{eff}$ = effective overall coefficient of heat transfer
$\zeta$ = effective heat transfer efficiency of heat exchanger
$A_s$ = internal heat exchanger area carrying solar radiation and in contact with working fluid.
$A_{Ap}$ = aperture area
$A_h$ = heat exchanger face area
$r_c$ = cavity ratio = $A_h/A_{Ap}$
$r_h$ = ratio of total heat exchanger surface to $A_h$ = $A_s/A_h$
L = length of heat exchanger tube
D = diameter of heat exchanger tube
$N_F$ = f/number
$N_{Re}$ = Reynolds number = $m \, D/A_h \mu$
$N_{Pr}$ = Prandtl number = $C_p/k$
m = mass flow rate
$C_p$ = heat capacity of working fluid
k = thermal conductivity of working fluid
$\mu$ = viscosity of working fluid Assuming given input and output temperatures, it is these indices or more particularly combinations of these indices which when designed to meet the stated guidelines provide for an optimally designed receiver which may be used, for instance, in a Brayton cycle system.

Figure 3:
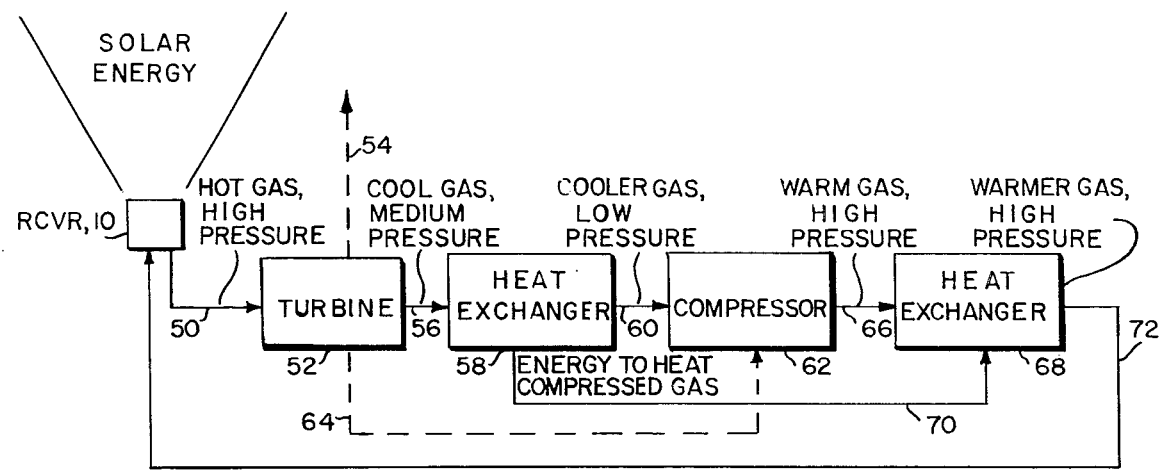
FIG. 3 is a block diagram illustrating the utilization of the solar receiver in a Brayton cycle system; and, FIG. 4 presents a series of graphs illustrating temperature profiles along the tubes of the heat exchanger utilized in the solar receiver.

A Brayton cycle system is schematically represented in FIG. 3 in which the receiver 10 is coupled via a line 50 to a turbine 52, the shaft output of which 54 may be coupled to a load, which, in general, may be an electric power generator. Solar energy impinges on receiver 10 which heats the working fluid. For a closed cycle Brayton system, the working fluid is usually a gas, which exits the receiver at its output end under high pressure. Thus, hot high pressure gas is utilized to power the turbine, and thereafter the remaining cool gas at medium pressure is coupled by line 56 to a heat exchanger 58. At the output of this heat exchanger, cooler gas at a lower pressure is coupled over line 60 to a compressor 62 which obtains its drive power from a mechanical linkage 64 to turbine 52. Note, in an open cycle Brayton engine, exhaust to atmosphere takes place after the turbine and air at atmospheric pressure is supplied to the intake of the compressor. In any case, the cooler gas at low pressure which is supplied to the compressor is slightly warmed during the compression process. The result is warmer gas at high pressure which is provided over line 66 to a second heat exchanger 68. Energy from heat exchanger 58 is coupled via a line 70 to heat exchanger 68 such that the warm high pressure gas which forms the input of this heat exchanger is now converted into warmer high pressure gas which is coupled over a line 72 back to receiver 10. Heat exchanger 58 and heat exchanger 68 are normally referred to as recuperators such that any energy in the gas which exits the turbine is utilized to heat the compressed gas after the compression has taken place.

The result of the Brayton cycle is that there is a net excess energy available to do work and this energy is available at the output shaft of turbine 52. Thus, solar energy is efficiently converted into mechanical energy via the Brayton cycle process.

In order to efficiently drive the Brayton cycle engine, temperatures in excess of 1800° F. are desirable. In order to achieve an 1800° F. exit temperature from the receiver, it is necessary to couple solar energy into the working fluid as efficiently as possible with a minimum of pumping energy, while at the same time providing that the solar energy receiver be built of materials which will withstand constant insolation over a number of years.

While in the past, solar receivers have been built which provide exit gas temperatures at 1800° F., in general, the face of the heat exchangers utilized in these receivers have been heated to temperatures well in excess of 1800° F. in order to achieve the requisite exit gas temperature.

It is a finding of this invention that with the appropriate setting of the aforementioned indices, it is only necessary to heat the face of the heat exchanger slightly above that temperature which is desired for the exit gas temperature. This being the case, the maximum temperature to which the heat exchanger is exposed may be minimized. It is a further finding of this invention that if the flow index is made to no greater than $6k\ L/D^2 r_c$ and if the convective index is made to be approximately twice the flow index, then heat exchanger face temperatures can be minimized with the consequent result of a relatively flat temperature profile along the heat exchanger tubes. Not only is the face temperature of the heat exchanger minimized for any given application, but also the variation of the temperature down the heat exchanger tube is also minimized, such that thermal stress which is ordinarily due to differential heating is also kept to an absolute minimum. This provides for a maximization in the life time of the heat exchanger and, thus, makes the subject design extremely commercially attractive. In addition, the reduced face temperature tends to increase receiver efficiency by reducing reradiation from the front face of the honeycomb.

Figure 4:
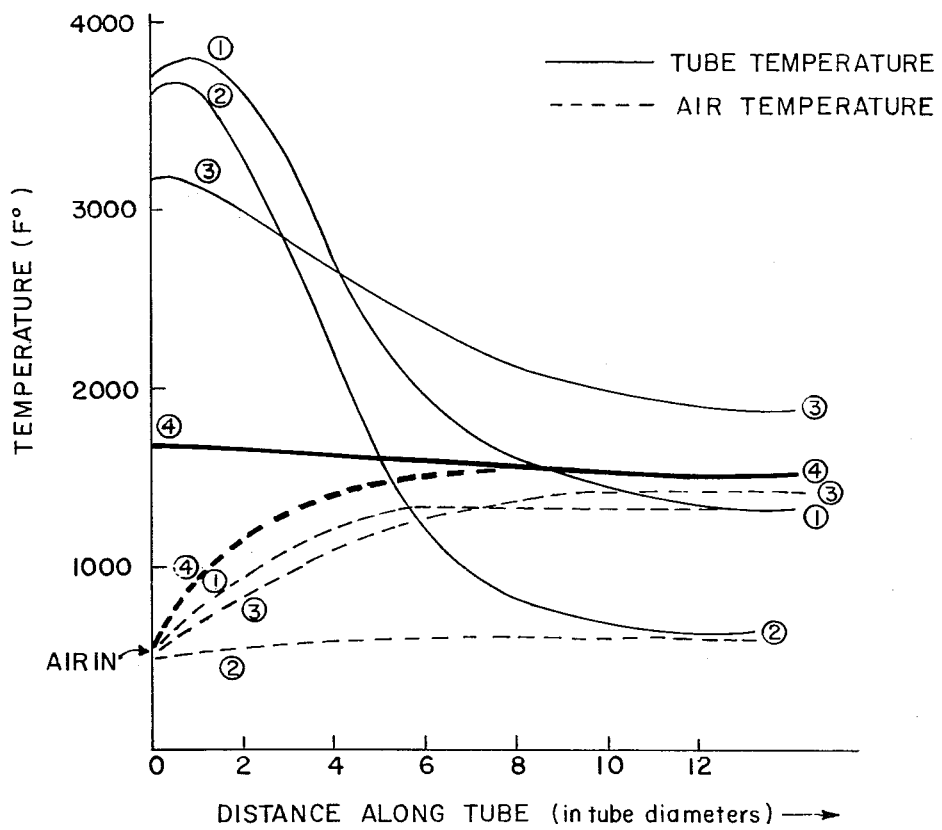

To give an indication of the results of the findings of the subject invention, attention is drawn to the graphs of FIG. 4.

In FIG. 4, distance along the tube in terms of tube diameters is measured on the horizontal axis, whereas the temperature of the tube is measured on the vertical axis. The temperature of the working fluid, in this case, air, is illustrated by the dotted lines whereas the tube temperature is illustrated by the solid lines. It will be appreciated that in this graph the incoming air is all one temperature, and as the air is heated by virtue of convection and conduction, the air temperature increases. The temperature increase, of course, occurs as the air travels down the tube. Likewise, the tube loses its energy to the working fluid as the air is heated. Obviously, when the tube temperature equals the air temperature, all of the available energy from the tube has been transferred to the working fluid.

The curves generated in FIG. 4 were the result of a complex computer analysis of the receiver illustrated in FIG. 2 in which conductive, convective, radiation and fluid flow transfer were considered from node to node throughout the receiver, with various weights being given to the amount of each one of these transfer mechanisms.

In the computer analysis, as a base line, a nominal flow was picked, in this case 0.1 pounds per second, per ft² of honeycomb and a nominal conductivity of 10 Btu/hr-ft-° F. was picked. The result of picking these two parameters resulted in curves numbered, both for the tube temperature and the working fluid temperature. As can be seen from the graph, it was calculated that the input temperature of the receiver just aft of the face of the heat exchanger would rise to approximately 3900° F. and would, thereafter result in the air temperature reaching approximately 1600° F. at 12 tube diameters away from the face of the heat exchanger. The second set of calculations required holding conductivity constant and multiplying the flow rate by 10. This resulted in the curves numbered, and showed that there is no apparent advantage since the face temperature is not significantly reduced. Note, moreover, that the exit temperature is considerably reduced. The third option involves holding the flow rate at the nominal value while multiplying the conductivity by a factor of 10. This resulted in the curves numbered. The resultant curves show a slight lowering of the face temperature. However, the working gas temperature never reaches the tube temperature, at least within 12 tube diameters of the face of the heat exchanger.

However, as can be seen by the curves numbered, with the same conductivity, but with the cavity ratio multiplied by 7 and the aperture area and the total mass flow of air kept the same (in which the face area of the heat exchanger was multiplied by 7) a substantially flat tube temperature profile was obtained. Moreover, an exit gas temperature of 1800° F. was obtained in approximately 7.0 tube diameters.

This result was unexpected and provides the following advantages: (1) The heat exchanger temperature never exceeds 1800° F. along the length thereof, (2) The variation of temperature along the tube is minimized, thereby, minimizing thermal stress and, (3) The length of honeycomb necessary to provide the requisite output temperature is minimized to approximately 7.0 tube diameters.

Having achieved a relatively flat temperature response curve with a resulting relatively short honeycomb length it was apparent that if the pumping energy expended in pumping the fluid through the receiver could be minimized, the efficiency of the receiver could be maximized. Normally, in order to minimize pumping energy, it is desirable to avoid turbulence and incorporate a laminar flow characteristic. However, as will be appreciated, while pumping energy may be minimized with laminar flow characteristics, the convective transfer of energy to the working fluid is maximized by turbulent flow. In order to strike the optimal balance between the laminar flow and turbulent flow conditions, the Graetz number, $N_{Re} \times N_{Pr} \times D/L$, was set approximately equal to 6. For Graetz numbers exceeding 6, heat transfer increases, but at the expense of pump energy; while for Graetz numbers less than 6, convective transfer efficiency is lost. Deciding that the Graetz number should be approximately equal to 6, implies that the flow index $I_{FLOW}$ $$= \frac{\dot{m} C_p}{A_{Ap}}$$

be set less than $$\frac{6\ kL}{D^2} r_c.$$

This choice of $I_{FLOW}$ thus generates a maximally efficient system without waste of either pumping energy or excess heat exchanger material.

In an experimental embodiment, after having selected the flow index, the convective index is then set to be approximately twice the flow index. The optical index for the receiver is additionally important in some cases. For optical indices greater than 6, 99% of the incoming rays are trapped in the heat exchanger tubes. Thus, less than 1% of the incoming solar radiation exits the tubes at the aft end and is lost. More specifically, for a given permissible percent loss of incident rays, $\delta_o$, then $$I_o \geq \frac{5}{2} \, \text{erf}^{-1}\left[\frac{(1+f)\delta_o}{200}\right]$$

where $f$ = fraction of solid in heat exchanger. With $$y = \text{erf}(x) = \frac{1}{\sqrt{2\pi}} \int_x^\infty e^{-t^2/2} dx,$$

its inverse function, $x = \text{erf}^{-1}(y)$ is tabulated in the *Handbook of Mathematical Functions* edited by M. Abramowitz & I. Stegun, Dover (1965) pages 966–977.

It will be appreciated that with the convective and flow indices set as indicated, the cavity ratio will be greater than 1, which is one of the conditions of the lines illustrated by reference character 4 in FIG. 4.

DEFINITION OF $U_{eff}$

In order to properly set the convective index, some average value of the film coefficient of heat transfer must be derived. While there are numerous averaging methods, the following offers a practical method for deriving $U_{eff}$.

In heat transfer between a tube or duct and an airstream, one can quantitatively characterize the process in terms of the properties of local segments. In principle, the subdivision into segments is arbitrary, with the analysis to be repeated at successively finer subdivisions, until further refinement yields no significant change in the total heat transferred.

At any stage of subdivision, each transverse "slice" of the tube can be characterized in terms of its surface area exposed to the airstream dA. The heat transferred across this surface is proportional to the temperature difference between surface and airstream, the area dA, and to a coefficient $h$. Values of $h$ are generally taken from experiments that make full use of scaling laws to yield the maximum of information from a given set of data using dimensional analysis and established relationships between dimensionless groups such as Reynolds' number, Prandtl's number and Nusselt's number, all of which have an experimentally established relationship for heat transfer in tubes or ducts. The relationships are often expressed graphically, but are available from handbooks as empirical relationships. Thus, values for $h$ in each segment can be expressed at each location as a function of the parameters that are involved in the three dimensionless groups mentioned above. These include tube diameter, cross sectional area and flow rate as well as properties of the working fluid (e.g. air) including thermal conductivity, heat capacity, and viscosity.

The basic heat transfer raltionship for each slice, dA, is summarized by the formula $dQ = hdA |T_{wall} - T_{FLUID}|$ where dQ refers only to the heat transferred from the hotter to the colder of wall and fluid.

The total heat transferred within the length of the tube or duct exposed to the fluid is $$Q = \int_{x=o}^{L} h(x) |T_{wall}(x) - T_{FLUID}(x)| \, dA$$

where the most general functional dependences on $x$ are explicitly shown. Generally, this relationship is expressed in the form $$Q = U_{eff} A \Delta T_{AV}$$

where $\Delta T_{AV}$ is the "average" difference in temperature between wall and fluid and A is the total tube area in contact with the fluid. In conventional heat exchanges, $\Delta T_{AV}$ is computed as LMTD (log mean temperature difference) that derives from particular relationships that apply strictly only to parallel or counterflow heat exchanger. For solar receivers, due to the distribution of incident radiation, the LMTD computation is incorrect, but averaging the segmental temperature differences is proper.

From the above expression for Q in terms of the details, $$U_{eff} = \frac{Q}{A \Delta T_{AV}} = \int_{x=o}^{L} \frac{h(x) |T_{Wall}(x) - T_{FLUID}(x)| \, dA}{A \Delta T_{AV}}$$

The value of $\Delta T_{AV}$, as well as an adequate numerical approximation to the integral (as a sum) can readily be seen as a sum of values for each segment if one takes $$dA = \pi D \, dx$$

For subdivision into segments this yields: $\Delta A = \pi D \Delta X$.

For tubes, D is the diameter. For ducts, $D \rightarrow D_H$, the hydraulic diameter, defined as $D_H = 4A_x/p$ $A_x$ = duct cross sectional area
$p$ = duct perimeter One consequence of this formula for $U_{eff}$ is that were $h$ and $|T_{wall} - T_{air}|$ independent of $x$, i.e. uniform along the tube length, one would obtain $U_{eff} = h$. With any other variation, $U_{eff} < h_{max}$.

For an equivalent result, for receivers with honeycomb tubes parallel to the optical axis of the receiver and for $U_{eff} = \zeta h$, then by hyperbolic tangents.

$$\zeta \approx \frac{\tanh(L/L_o)}{(L/L_o)}$$

L = length of honeycomb tubes
h = local film coefficient of heat transfer $$L_o \approx \sqrt{\frac{kA_x}{hp}} = \sqrt{\frac{k}{h} \frac{t}{2}}$$

$A_x$ = cross sectional area of tube
$p$ = tube perimeter
$k$ = thermal conductivity of honeycomb material
$t$ = wall thickness of the honeycomb What has therefore been provided is a set of parameters or indices which are extremely useful in maximizing the lifetime of a solar energy receiver which utilizes a focused solar radiation. Additionally, the indices indicate a method of minimizing the mass of heat exchanger material, thereby minimizing the cost of the solar receiver. These two advantages have been accomplished without sacrifice of efficiency and, in fact, the efficiency of the receiver is enhanced by the utilization by the above mentioned indices and their interrelated qualities.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. A method of providing an optimally designed long life solar energy receiver, comprising:
    providing a receiver having a face adapted to be exposed to focused solar radiation, said face having an aperture therethrough, a heat exchanger positioned within the receiver so as to be illuminated by focused solar radiation passing through said aperture, said heat exchanger having channels, and means for providing a working fluid to said channels at a predetermined rate; and
    setting the convective and flow indices for the receiver so as to minimize the face temperature of the heat exchanger in the receiver.

2. The method of claim 1 wherein the flow index is dependent upon the Graetz number and wherein the Graetz number to which the receiver is set is that which minimizes pumping energy while at the same time maximizing energy transfers to the working fluid.

3. The method of claim 1 wherein the flow index is dependant upon the Graetz number and wherein the Graetz number is 6.

4. The method of claim 1 wherein the convective index is approximately twice the flow index.

5. A method of prolonging the life of a solar energy receiver, comprising:
    providing receiver having a face adapted to be exposed to focused solar radiation; said face having an aperture therethrough, a heat exchanger positioned so as to be exposed to focused solar radiation passing through said aperture, said heat exchanger having channels, and means for providing a working fluid to said channels at a predetermined rate; and
    setting the convective and flow indices of the receiver such that temperature differences along the heat exchanger are minimized.

6. The method of claim 5 wherein the flow index is depending upon the Graetz number and wherein the Graetz number to which the receiver is set is that which minimizes pumping energy while at the same time maximizing energy transfer to the working fluid.

7. The method of claim 5 wherein the flow index is dependent upon the Graetz number and wherein the Graetz number is 6.

8. The method of claim 5 wherein the convective index is approximately twice the flow index.

9. A method of prolonging the life of a solar energy receiver utilizing a working fluid and which has a heat exchanger face illuminated by focused solar radiation by setting the flow and convective indices of said receiver such that the face temperature of the heat exchanger is within a predetermined small percent of the exit fluid temperature, said heat exchanger having channels and said receiver having means for providing a working fluid to said channels at a predetermined rate.

10. The method of claim 9 wherein the low index is dependent upon the Graetz number and wherein the Graetz number to which the receiver is set is that which minimizes pumping energy while at the same time maximizing energy transfer to the working fluid.

11. The method of claim 9 wherein the flow index is dependent upon the Graetz number and wherein the Graetz number is 6.

12. The method of claim 9 wherein the convective index is approximately twice the flow index.

13. A method of providing an optimally designed long life solar receiver, comprising:
    providing a receiver having a housing with an aperture adapted to be exposed to focused solar radiation, a heat exchanger positioned so as to be exposed to focused solar radiation passing through said aperture, said heat exchanger having channels, and means for providing a working fluid to said channels at a predetermined rate; and
    setting the cavity ratio, convective index, and flow index of the receiver, such that the heat exchanger runs at a substantially uniform temperature.

14. The method of claim 13 wherein the flow index is dependent upon the Graetz number and wherein the Graetz number to which the receiver is set is that which minimizes pumping energy while at the same time maximizing energy transfer to the working fluid.

15. The method of claim 13 wherein the flow index is dependent upon the Graetz number and wherein the Graetz number is 6.

16. The method of claim 13 wherein the convective index is approximately twice the flow index.

17. A solar energy receiver for use with focused solar energy and a working fluid wherein the focusing system has an f/number, $N_F$, comprising:
    a housing adapted to be located at the focus of said focusing system, said housing having an open end adapted to face said focusing means such that focused sunlight passes through said open end, said open end defining an aperture of a size $A_{Ap}$,
    a heat exchanger within said housing having a number of channels each of length L and a diameter D, said channels having a total surface area in contact with the working fluid, $A_s$, said channels being opened towards said aperture and having a face area $A_h$, and,
    means for directing fluid flow through said channels such that when solar energy is focused onto said heat exchanger said fluid is heated,
    the convective index of said receiver, $U_{eff} A_s/A_{Ap}$, being equal to or greater than the flow index of said receiver, $m C_p/A_{Ap}$, the optical index of said receiver, $L/DN_F$, being greater than 6, and the Graetz number being equal to or less than 6, where $U_{eff}$ is the effective coefficient of heat transfer, m is the mass flow rate, and $C_p$ is the heat capacity of the working fluid.

18. The receiver of claim 17 wherein the flow index of the receiver is equal to or less than $6kl/D^2 r_c$, where $r_c = A_h/A_{Ap}$, $A_h$ is the heat exchanger face area and where k is the thermal conductivity of the working fluid.

19. A solar energy receiver for use with focused solar energy comprising:
    a housing having an open end, said housing adapted to be oriented such that focused sunlight passes through said open end,
    a heat exchanger within said housing having a number of channels, said channels opened towards said aperture, and, means for directing fluid flow through said channels such that when solar energy is focused onto said heat exchanger said fluid is heated, the convective index of said receiver being approximately twice the flow index of said receiver, the optical index of said receiver being greater than 6, and the Graetz number being equal to or less than 6.

20. A solar energy receiver for use with focused solar energy comprising:

a housing having an open end, said housing adapted to be oriented such that focused sunlight passes through said open end, a heat exchanger within said housing having a number of channels, said channels opened towards said aperture, and, means for directing fluid flow through said channels such that when solar energy is focused onto said heat exchanger said fluid is heated, the convective index of said receiver being approximately twice the flow index for said receiver, and the Graetz number being equal to or less than 6, whereby the heat exchanger temperature profile is relatively flat and substantially horizontal to reduce thermal shock and increase the lifetime of said receiver without significant increases in expended pumping energy.

21. A solar energy receiver for use with focused solar energy comprising:

a housing having an open end, said housing adapted to be oriented such that focused sunlight passes through said open end, a heat exchanger within said housing having a number of channels, said channels opened towards said aperture, and, means for directing fluid flow through said channels such that when solar energy is focused onto said heat exchanger said fluid is heated, the heat exchanger temperature vs. channel length profile being relatively flat and substantially horizontal, whereby said heat exchanger is exposed to minimum thermal shock without sacrifice to efficiency.

* * * * *